(12) United States Patent
Ciochina et al.

(10) Patent No.: US 11,050,479 B2
(45) Date of Patent: Jun. 29, 2021

(54) COMMUNICATION DEVICE AND METHOD

(71) Applicant: Sony Corporation, Tokyo (JP)

(72) Inventors: Dana Ciochina, Stuttgart (DE);
Thomas Handte, Stuttgart (DE); Nabil Sven Loghin, Stuttgart (DE); Felix Fellhauer, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/329,766

(22) PCT Filed: Aug. 11, 2017

(86) PCT No.: PCT/EP2017/070474
§ 371 (c)(1),
(2) Date: Mar. 1, 2019

(87) PCT Pub. No.: WO2018/046235
PCT Pub. Date: Mar. 15, 2018

(65) Prior Publication Data
US 2019/0245607 A1    Aug. 8, 2019

(30) Foreign Application Priority Data

Sep. 9, 2016    (EP) ..................................... 16188126

(51) Int. Cl.
*H04B 7/06*    (2006.01)
*H04B 7/08*    (2006.01)
*H04W 74/08*    (2009.01)

(52) U.S. Cl.
CPC ............. *H04B 7/0695* (2013.01); *H04B 7/06* (2013.01); *H04B 7/0617* (2013.01); *H04B 7/08* (2013.01);
(Continued)

(58) Field of Classification Search
CPC ........ H04B 7/0695; H04B 7/086; H04B 7/08; H04B 7/06; H04B 7/0617; H04W 74/0816
See application file for complete search history.

(56) References Cited

U.S. PATENT DOCUMENTS 9,584,198 B1 *    2/2017  Tujkovic .............. H04B 7/0413
2005/0185733 A1 *  8/2005  Tolli ...................... H04L 1/0025
                                                            375/285

(Continued)

FOREIGN PATENT DOCUMENTS

WO    WO-2015045659 A1 *  4/2015

OTHER PUBLICATIONS

International Search Report dated Jul. 11, 2017 for PCT/EP2017/070474 filed on Aug. 11, 2017, 15 pages.
(Continued)

*Primary Examiner* — Syed Haider
(74) *Attorney, Agent, or Firm* — Xsensus LLP (57) ABSTRACT

A first communication device for communicating with a second communication device over a link that is utilized at the substantially same time and with the substantially same frequency resource by a pair of further communication devices. The first communication device comprises one or more antenna arrays with which beamforming can be performed, a controller configured to apply beamformers to control beamforming by the one or more antenna arrays, and circuitry configured to determine whether at least one of the beamformers satisfies an interference condition such that a level of interference leaked to the further communication devices by the first communication device is below a defined threshold, and if available, select the at least one beamformer for communicating with the second communication device.

22 Claims, 6 Drawing Sheets

(52) U.S. Cl.
CPC ........ *H04B 7/086* (2013.01); *H04W 74/0816* (2013.01)

(56) References Cited

U.S. PATENT DOCUMENTS

| | | | | |
|---|---|---|---|---|
| 2011/0177834 | A1* | 7/2011 | Shin | H04L 25/03343 455/501 |
| 2013/0090141 | A1* | 4/2013 | Hottinen | H04W 72/1231 455/501 |
| 2015/0103933 | A1* | 4/2015 | Nagata | H04B 7/0482 375/260 |
| 2015/0341092 | A1* | 11/2015 | Park | H04L 5/0057 370/329 |
| 2015/0358057 | A1* | 12/2015 | Lindqvist | H04L 5/1469 370/329 |
| 2016/0205633 | A1* | 7/2016 | Mizusawa | H04B 7/0404 455/522 |
| 2017/0195142 | A1* | 7/2017 | Sanderovich | H04B 7/0617 |

OTHER PUBLICATIONS

IEEE, "Wireless LAN Medium Access Control (MAC) and Physical Layer (PHY) Specifications", IEEE Std. 802.11, Dec. 28, 2012, 628 pages.

Zheng et al., "Robust Beamforming in Cognitive Radio", In Proceedings of the 69th IEEE Vehicular Technology Conference, Barcelona, Spain, Apr. 26-29, 2009, 5 pages.

Singh et al., "On the feasibility of beamforming in millimeter wave communication systems with multiple antenna arrays",IEEE, Wireless Communications Symposium, pp. 3802-3808, 2014.

Alkhateeb et al., "Channel Estimation and Hybrid Precoding for Millimeter Wave Cellular Systems", IEEE Journal of selected topics in signal processing, vol. 8, No. 5, Oct. 2014, pp. 831-846.

Office Action dated May 8, 2020 in Korean Patent Application No. 10-2019-7006798, 13 pages.

* cited by examiner

COMMUNICATION DEVICE AND METHOD

CROSS-REFERENCE TO RELATED APPLICATIONS

The present application is based on PCT filing PCT/EP2017/070474, filed Aug. 11, 2017 which claims priority to EP 16188126.3, filed Sep. 9, 2016, the entire contents of which are incorporated herein by reference.

BACKGROUND

Field of the Disclosure

The present disclosure relates to a communication device and a communication method for communicating over a link that is utilized substantially at the same time and with the same frequency resources by a pair of further communication devices. Further, the present disclosure relates to an interference alignment module used in such communication device as well as to computer product for implementing the communication method.

Description of Related Art

The use of the millimeter (mm) wave band for wireless communication has gained considerable attention recently as vast amounts of spectrum are available in the mm-wave band (typically considered to be between 30 and 300 GHz) allowing high data communications.

To enable communication at such frequencies (e.g., 60 GHz), a large number of antenna elements are required, which form very directive patterns (known as beamforming) and thus achieve high gains. However, controlling a large number of antennas simultaneously requires a large number of RF chains, which is prohibitive from both cost and complexity perspectives. Thus, in practice architectures in which multiple phased antenna elements are grouped together in a so called phased antenna array (PAA) have emerged (i.e., per PAA, only phases can be controlled, e.g, by introducing delay lines; according to phase settings, directivity can be achieved). Each PAA is connected to a dedicated RF chain or to multiple RF chains. Based on such architectures a combination of coarse analog beamforming and fine digital beamforming can be achieved.

Analog beamforming corresponds to the act of physically steering one or more directional beams into a preferred direction, e.g. by means of analog phase shifters or by changing the phase characteristics of an antenna array. Additionally, finer digital beamformers can be created on top of the analog ones. Digital beamforming corresponds to a more general concept, in which both amplitudes and phases can be controlled of each transmitted beam. After pre-coding at transmitter side, and decoding at receiver side, the beams can be separated again.

Communication in the mm-wave band is thus highly directive making it possible and desirable to design protocols which facilitate multiple devices to communicate with each other over the same frequency resources at the same time. Such an approach is also referred to as spatial reuse (SR). Essential for SR is, however, that the communication of the devices already occupying a particular link is not adversely affected by the devices trying to reuse the link. Hence, it is required that the interference created by the SR devices is controlled in such a manner that the interference at the devices already occupying the link is kept below a desired level. A mechanisms devised to achieve such control is referred to as interference alignment (IA). Typical for IA is that IA is performed on the individual device in an uncoordinated manner, i.e., not controlled by a master or a central interference alignment device.

Unfortunately, state of the art robust beamforming techniques, which have the potential to provide IA for SR, cannot be directly applied to the mm-wave domain, because these generally assume some form of channel state information (CSI) at the transmitters obtained either implicitly, through channel reciprocity, or explicitly through some kind of CSI feedback. Explicitly obtaining CSI in the mm-wave domain, however, proves to be difficult since full knowledge of the channels, i.e. from each antenna element of the transmitter to each antenna element of the receiver, may only be obtained if each antenna element can be controlled independently. However, for communication in the mm-domain using phased antenna arrays this is typically not the case.

Furthermore, reciprocity between the transmitting and the receiving antenna patterns in mm-wave communication is typically not fulfilled since, for instance, different amplifier types are used for transmission and reception. Therefore, obtaining CSI implicitly can be too erroneous and is thus not feasible in most mm-wave scenarios. IA based on such assumption may hence be insufficient and may lead to an incorrect estimation of the interference that a mm-wave transmitter may leak to other devices.

Hence, there is a need for improved IA for SR in the mm-wave domain taking the above circumstance into account.

It shall be noted that the "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a communication device and method providing interference alignment for spatial reuse in the mm-wave domain, in particular, interference alignment that is not relying on full channel knowledge and reciprocity of the transmission and reception antenna patterns. It is a further object to provide an interface alignment module as well as a corresponding computer program for implementing the disclosed communication method and a non-transitory computer-readable recording medium for implementing the disclosed communication method.

According to an aspect there is provided a first communication device for communicating with a second communication device over a link that is utilized at the substantially same time and with the substantially same frequency resource by a pair of further communication devices, said first communication device comprising: one or more antenna arrays with which beamforming can be performed; a control unit configured to apply beamformers to control beamforming by the one or more antenna arrays; and an interference alignment module configured to determine whether at least one of the beamformers satisfies an interference condition such that a level of interference leaked to the further communication devices by the first communication device is below a defined threshold, and if available, select the at least one beamformer for communicating with the second communication device, wherein the interference condition is based on channel characteristics between the first communication device and at least one of the further communication devices and non-reciprocity mismatch of said at least one further communication device.

According to a further aspect there is provided an interference alignment module for use in a communication device for communicating with another communication device over a link that is utilized at the substantially same time and with the substantially same frequency resource by a pair of further communication devices, the communication device comprising one or more antenna arrays with which beamforming can be performed and a control unit configured to apply beamformers to control beamforming by the one or more antenna arrays, the interference alignment module comprising: an determination unit for determining whether at least one of the beamformers satisfies an interference condition such that a level of interference leaked to the further communication devices by the first communication device is below a defined threshold, and if available, selecting the at least one beamformer for communicating with the second communication device, wherein the interference condition is based on channel characteristics between the first communication device and at least one of the further communication devices and non-reciprocity mismatch of said at least one further communication device.

According to a further aspect there is provided a communication device for communicating with another communication device having one or more antenna arrays using different transmission and reception antenna patterns, the communication device comprising: an evaluation unit for evaluating a non-reciprocity mismatch between the transmission and reception antenna patterns, and a transmission unit for transmitting a value indicative of a level of non-reciprocity of the transmission and reception antenna patterns to a further communication device.

According to a further aspect there is provided a communication method for communicating with a communication device over a link that is utilized at the substantially same time and with the substantially same frequency resource by a pair of further communication devices, the method comprising: applying beamformers by a control unit to one or more antenna arrays to perform beamforming; determining whether at least one of the beamformers satisfies an interference condition such that a level of interference leaked to the further communication devices by the first communication device is below a defined threshold; and if available, selecting the at least one beamformer for communicating with the second communication device, wherein the interference condition is based on channel characteristics between the first communication device and at least one of the further communication devices and non-reciprocity mismatch of said at least one further communication device.

According to a further aspect there is provided a communication system comprising a first and a second communication device and a pair of further communication devices, the first communication device being configured to communicate with the second communication device over a link that is utilized at the substantially same time and with the substantially same frequency resource by a pair of further communication devices, wherein first communication device comprises one or more antenna arrays with which beamforming can be performed, a control unit configured to apply beamformers to control beamforming by the one or more antenna arrays, and an interference alignment module configured to determine whether at least one of the beamformers satisfies an interference condition such that a level of interference leaked to the further communication devices by the first communication device is below a defined threshold, and if available, select the at least one beamformer for communicating with the second communication device, the interference condition being based on channel characteristics between the first communication device and at least one of the further communication devices and non-reciprocity mismatch of said at least one further communication device, wherein at least one of the pair of further communication devices comprises one or more antenna arrays having different transmission and reception antenna patterns, an evaluation unit for evaluating a non-reciprocity mismatch between the transmission and reception antenna patterns, and a transmission unit for transmitting a value indicative of a level of non-reciprocity of the transmission and reception antenna patterns to a further communication device.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed first communication device and as defined in the dependent claims and/or disclosed herein.

One of the aspects of the disclosure is to enable two devices to re-utilize an already occupied mm-wave frequency channel, without adversely affecting the communication devices already occupying the frequency channel. The proposed communication device and method is suitable for practical mm-wave antenna configurations in which antenna elements are grouped together in arrays, which are controlled by a limited number of RF chains. The communication device and method allow interference at the devices, which occupy the frequency channel, to be kept below a desired limit, even when these are not capable of achieving reciprocity in their transmission and reception antenna patterns. Furthermore, the approach avoids cumbersome estimation of the full channel between transmitting and receiving devices.

In particular, the disclosed communication device and method take into account a non-reciprocity mismatch between the transmission and reception antenna patterns of the communication devices that are already occupying the link that is to be re-utilized. Thereby, a more realistic estimation can be made of the interferences leaking from the communication device to other communication devices, and thus a more realistic interference alignment is feasible. The additional signaling required for the communication device and method can be easily integrated in future IEEE802.11 standards or 5 G mm-wave related standards without introducing any large overhead to the protocol.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
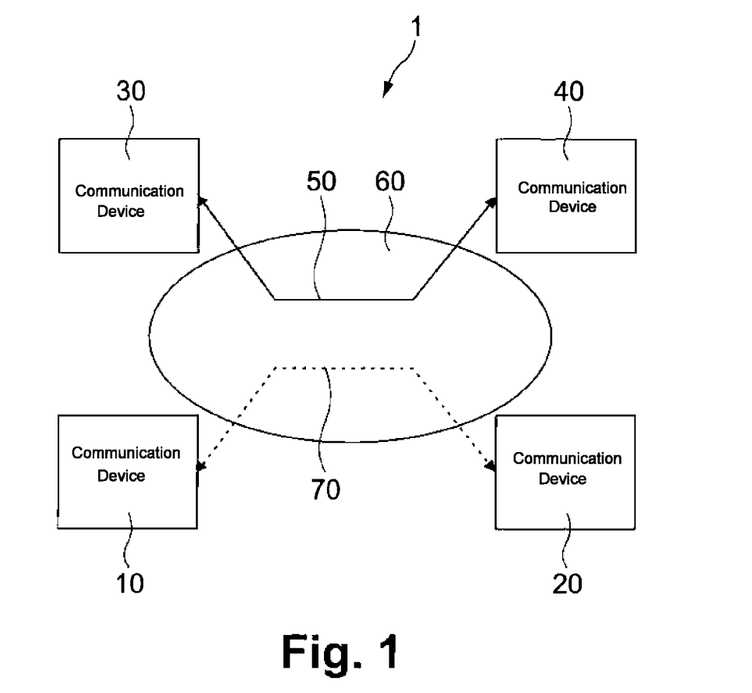
FIG. 1 shows an exemplary embodiment of the communication system according to the present disclosure.

Referring now to the drawings, wherein like reference numerals designate identical or corresponding parts throughout the several views, FIG. 1 shows an exemplary embodiment of the communication system according to the present disclosure.

The exemplary communication system of FIG. 1 shows four communication devices 10, 20, 30, 40 capable of communicating in a defined mm-wave band. The communication devices 10, 20, 30, 40 could, for instance, be access points or mobile stations such as smartphones, laptops etc. With reference numeral 10 a first communication device according to the present disclosure is denoted. Reference numerals 20, 30 and 40 denote a second communication device and two further communication devices respectively. Despite the different labels used for these devices, the devices can essentially be all of the same kind and configured in a similar or equivalent manner.

As depicted in FIG. 1, a primary link 50 has been established between the two further communication devices 30, 40 using a dedicated radio resource 60, e.g., frequency channel. At the same time, the first communication device 10 seeks to communicate with the second communication device 20 by using the same radio resource 60 that is being used by the primary link 50. In other words, the first communication device 10 tries to establish a spatial reuse link using the same radio resource 60 at substantially the same time, wherein the same time refers here to the same transmission opportunity or the same time slot that is being used by the two further devices 30, 40. The spatial reuse link is indicated here by the dashed arrow 70

To establish the spatial reuse link between the first and the second communication device 10, 20, it must be ensured that a communication over the spatial reuse link 70 does not adversely affect the communication of the two further communication devices 30, 40 over the primary link 50. In other words, if the first communication device 10 transmits data over the spatial reuse link 70, the first communication device 10 must ensure that either no interference leaks to any of the two further communication devices 30, 40 or that this interference is below a certain, preferably variable, limit. This process of determining whether the interference, when using particular analog beam formers, is below a certain threshold is addressed in this disclosure. Whereas primarily analog beamforming is addressed herein, it shall be noted that digital beamforming may be optionally applied as well.

Figure 2:
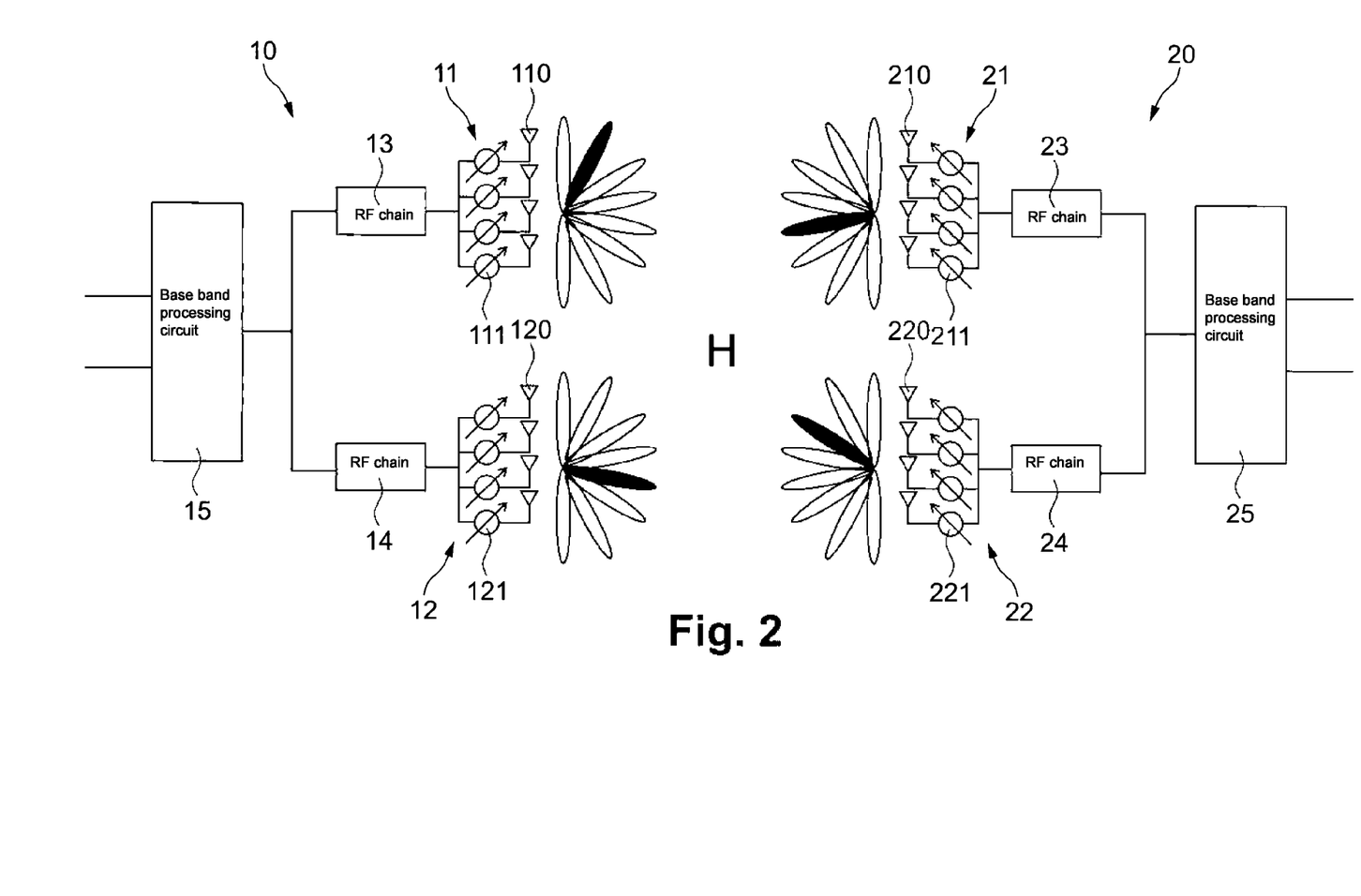
FIG. 2 shows a schematic diagram of an exemplary embodiment of the first and the second communication device according to the present disclosure.

Before details of the disclosed interference alignment approach for spatial reuse are explained, some explanation shall be provided about analog and hybrid beamforming in general. FIG. 2 shows a schematic diagram of the first and the second communication device 10, 20 of the exemplary communication system 1 shown in FIG. 1.

The first and the second communication device 10, 20 intend to communicate with each other over a channel which is described here by channel matrix H. The first communication device 10 generally has one or more (two in this embodiment) antenna arrays 11, 12 each comprising two or more (four in this embodiment) antenna elements 110, 120. The second communication device 20 is similar to the first communication device 10 and has one or more (two in this embodiment) antenna arrays 21, 22, each comprising two or more (four in this embodiment) antenna elements 210, 220. It shall be noted that the communication device is not limited to communication devices having exactly the same structure. In other embodiments, the two communication devices communicating with each other can have different antenna setups.

Analog beam forming is often implemented using a network of digitally controlled phase shifters. In this configuration, the antenna elements 110, 120, 210, 220 belonging to one antenna array 11, 12, 21, 22 are connected via phase shifters 111, 121, 211, 221 to a single RF chain 13, 14, 23, 24, as illustrated in FIG. 2 showing a communication system using hybrid architecture. Generally, the phase shifters weights are adaptively adjusted using digital signal processing using a specific strategy to steer one or more beams and meet a given objective, for example to maximize received signal power. The hybrid architecture shown in FIG. 2 uses MIMO communication at mm-wave frequencies and comprises, in addition to the analog domain, a digital domain. In the digital domain base band preprocessing and combining is performed using a base band processing circuit 15, 25 coupled to the respective RF chains 13, 14, 23, 24. Such a communication architecture is commonly known in the prior art.

Figure 3:
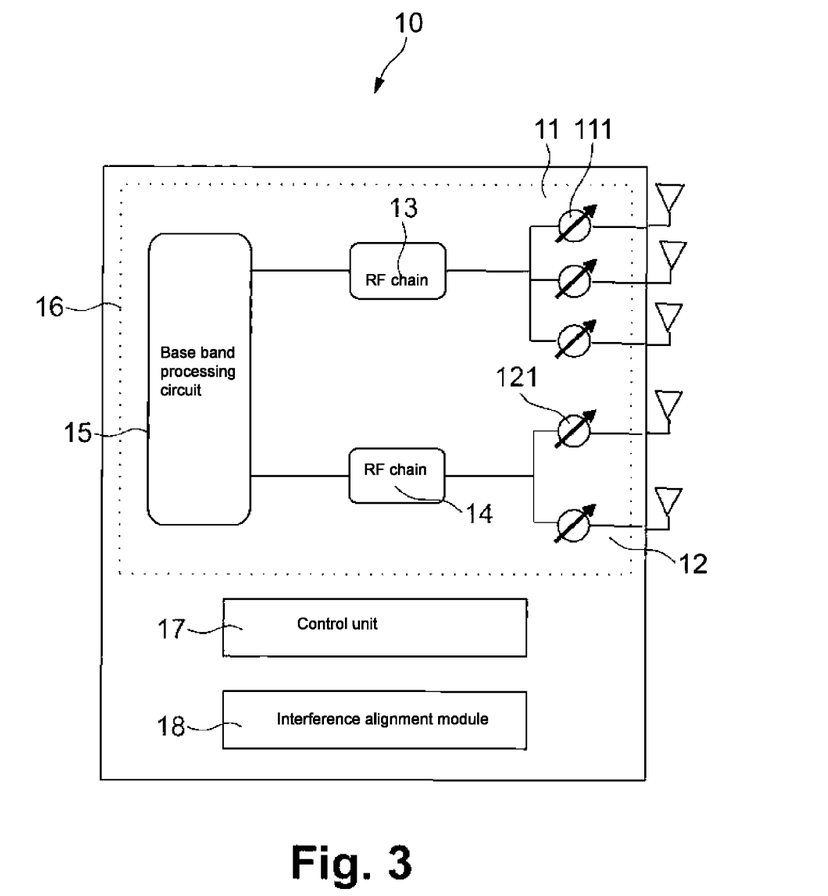
FIG. 3 shows a schematic diagram of an embodiment of a first communication device according to the present disclosure.

FIG. 3 shows a schematic diagram of an embodiment of a first communication device 10 according to the present disclosure. In this embodiment the first communication device 10 comprises a communication unit 16 as explained in detail with reference to FIG. 2. Furthermore, the first communication device comprises a control unit 17 configured to apply beamformers, i.e. antenna weight vectors (AWV), to control beamforming by the one or more antenna arrays 11, 12. Applying beamformers in this regard refers to adjusting the individual phase shifters 111, 121 by the control unit 17 such that a desired directivity is being achieved. Beamformers are generally defined by antenna weight vectors (AWV), wherein each element of the vector defines the setting of an individual phase shifter.

In order to establish the spatial reuse link 70 the control unit 17 applies a beamformer which is selected according to the interference alignment processing according to the present disclosure. The interference alignment processing ensures that one or more beamformer is selected in such a manner that the created beam does not interfere with beams selected by the further communication devices 30, 40 for communicating over the primary link. In order to select an appropriate beamformer, which is not interfering, the first communication device 10 comprises an interference alignment module 18. The interference alignment module 18 is configured to determine whether at least one beamformer satisfies an interference condition such that a level of interference leaked to the further communication devices by the first communication device is below a defined threshold. Thereby, the interference condition is based on channel characteristics and non-reciprocity mismatch of at least one of the two further communication devices 30, 40. If a beamformer satisfies the interference condition, the beamformer is selected to establish the spatial reuse link 70 with the second communication device.

Figure 4:
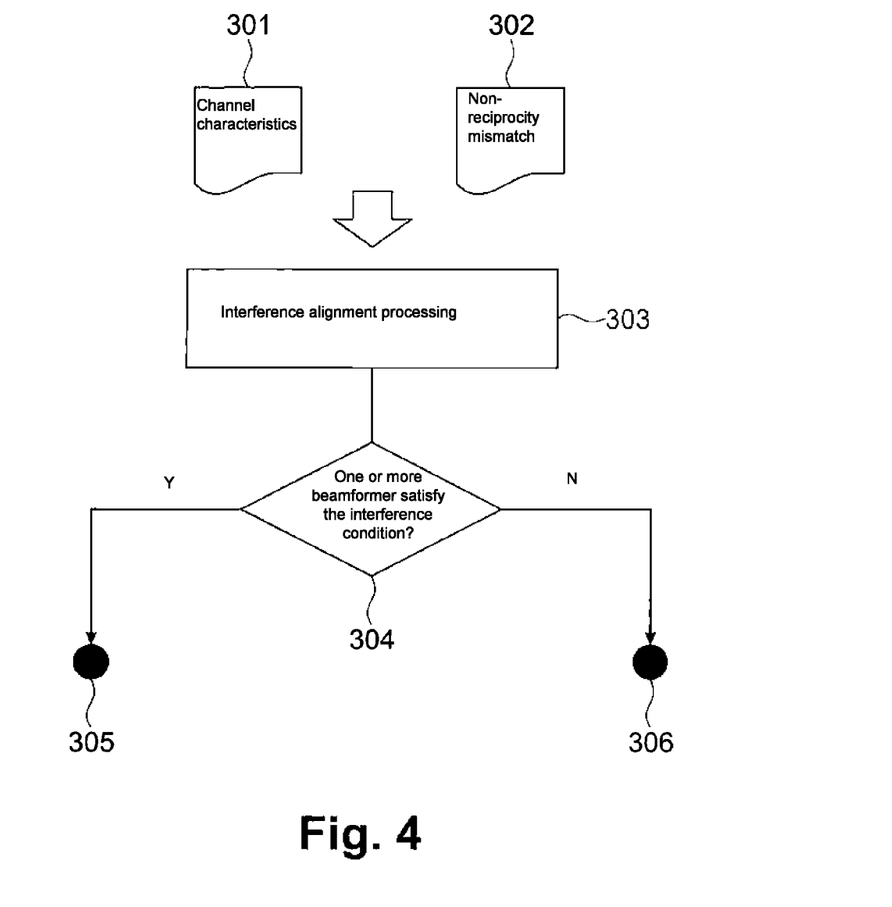
FIG. 4 shows a simplified flow chart of a first embodiment of the communication method according to the present disclosure.

The function of the interference alignment module 18 is described in detail with reference to FIG. 4. FIG. 4 shows a simplified flow chart of a first embodiment of the communication method for interference alignment according to the present disclosure. In particular, FIG. 4 shows the steps required to perform interference alignment according to the present disclosure. It is understood that the communication method may include further steps or additional intermediate steps which are not depicted in this flow chart.

In FIG. 4, with reference numerals 301 and 302, a first and a second input to the interference alignment process are denoted. The first input 301 constitutes channel characteristics between the first communication device and one of the further communication devices. Preferably, the channel characteristics are an estimation of the channel between these two devices which is determined by the first communication device detecting flow control signals exchanged between the further communication devices currently occupying the radio resource. Typically, the flow control information includes a Request-to-Send (RTS) Signal, which is sent from one of the further communication trying to send data, and a Clear-to-Send (CTS) signal, which is transmitted as a response to the RTS-Signal from the communication partner. Preferably, each signal of the flow control information includes beamforming training units or one or more channel estimation sequences or a combination of both types of training information, which can be used by the first communication device to estimate the channel characteristics from to the further communication device, which is transmitting the flow control signals.

In an embodiment, the interference alignment module is configured to apply one or more receive beamformers to determine the channel characteristics between a transmitting device of the pair of further communication devices and the first communication device.

The second input 302 to the interference alignment processing constitutes non-reciprocity mismatch information of one of the further communication devices, in particular, of the further communication device, with regard to which the channel characteristics have been determined. The non-reciprocity mismatch is a measure indicative of a mismatch of the transmission pattern and the reception pattern of said further communication device. In particular, the non-reciprocity mismatch depends on a difference between transmission and reception antenna patterns of said further communication device. Possible sources for non-reciprocity could be the use of different types of amplifies in the transmission and reception strand (Power Amplifies vs. Low-Noise-Amplifies), different phase shifter settings and/ or different effects of the Analog/Digital- and Digital/Analog-Converters that are being used.

The non-reciprocity mismatch information preferably includes a level of non-reciprocity of the transmission and reception antenna patterns. The level of non-reciprocity could be a specific value, a range or some other quantifier indicative of the mismatch. In a preferred embodiment the non-reciprocity mismatch is indicative of the largest mismatch between the analog antenna weight vectors of the transmission and reception patterns used by the one of the further communication devices which has been receiving data during a transmission opportunity.

The non-reciprocity mismatch is preferably determined individually by a communication device and provided to the other communication devices in the network. In a preferred embodiment, the non-reciprocity information is included in the flow control information exchanged between two communication partners that are communicating with each other. For example, in an embodiment the non-reciprocity mismatch information could be appended to either of the RTS or CTS-Signal. In this case, a first communication device, which is trying to re-utilize the same link occupied by two further communication devices, could simply monitor the flow control message exchange of these two further communication devices in order to obtain the non-reciprocity mismatch. It goes without say that other ways of obtaining the non-reciprocity mismatch information are conceivable.

In a preferred embodiment the level of non-reciprocity includes a value quantifying the mismatch between the transmission and reception antenna patterns of the at least one of the pair of further communication devices and information indicative of a distance measure based on which this value was calculated. Based on this information it can easily and efficiently be determined whether the interference condition is satisfied.

In a particular preferred embodiment the transmission and reception antenna patterns of the at least one of the pair of further communication devices are described based on AWVs, and the value quantifying the mismatch is computed by a distance measure between these vectors, in particular the Euclidean distance.

Step 303 refers to the interference alignment processing itself. In this step, the communication device determines whether at least one beamformer is available that satisfies a defined interference condition. In other words, in this step a beamformer is selected, if possible, which can be used to communicate with another device over the already occupied link such that interferences leaking towards the further communication device occupying the link is kept below a tolerable level.

Depending on the setup of the involved communication devices the interference condition may be in closed form. However, in other setups the interference condition can also be more complex requiring convex solvers to determine if the condition is satisfied. The interference condition is based on the estimated channel characteristics and the non-reciprocity mismatch information obtained from the other communication device. Thereby, not only the estimated channel characteristics between the first communication device and the further communication device are taken into account but also an uncertainty in this estimation depending on the a mismatch between the reception and transmission patterns of said further communication device.

Hence, interference alignment according to the present disclosure takes into account that a relevant interference may be encountered on a receive beam even if an interference on the transmission beam is predicted to be irrelevant. Thereby, a decision of whether a link can be re-utilized is based on a more realistic estimation, since reciprocity of the transmission and reception patterns is generally not given. Other potential causes of errors in the estimation of the channel characteristics, due to the first communication device e.g., hardware limitations or limitations in the number of measurements which can be performed, can be straightforwardly incorporated in the solution.

If one or more beamformer can be determined that satisfy the interference condition, it is decided at step 304 to reuse 305 the link occupied by the further communication devices. If no beamformer can be determined that satisfies the interference condition, spatial reuse is not feasible and the interference alignment processing restarts 306 in order to determine if spatial reuse is possible in the next transmission opportunity. In one embodiment, in case IA is not feasible, the first communication device will defer communication for at least the duration of the link occupancy. Afterwards IA or simple channel access mechanisms may be performed.

In an embodiment, determining whether at least one of the beamformers satisfies the interference condition may include comparing the value of a worst case interference with a threshold value defining the highest tolerable interference. The threshold can be predefined, for instance in a standard, or set individually by one of the pair of further communication devices occupying the primary link.

In a preferred embodiment the threshold can be transmitted along with the flow control signals exchanged between the pair of further communication devices and could be based on channel quality between the pair of further communicating devices and the intended modulation and coding scheme to be utilized between these.

Alternatively, the threshold may be derived from specific information transmitted by at least one of the further communication devices.

Figure 5:
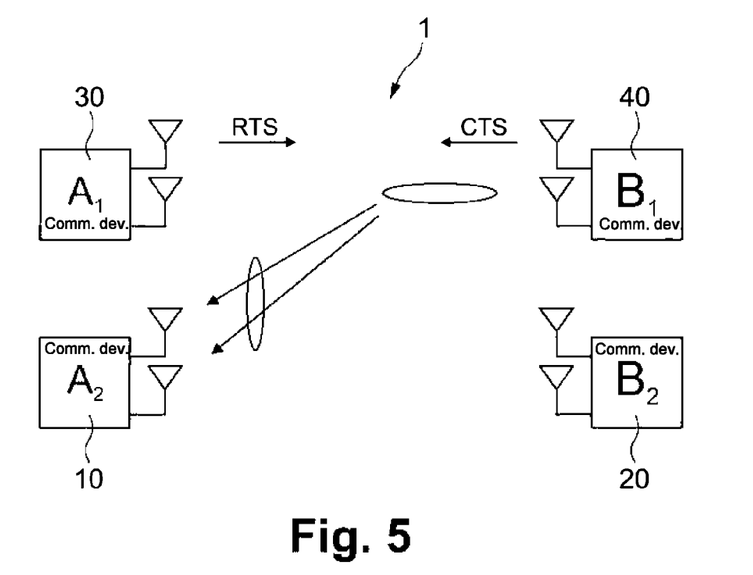
FIG. 5 shows in a schematic diagram processing of the first communication device according to the present disclosure.
Figure 6:
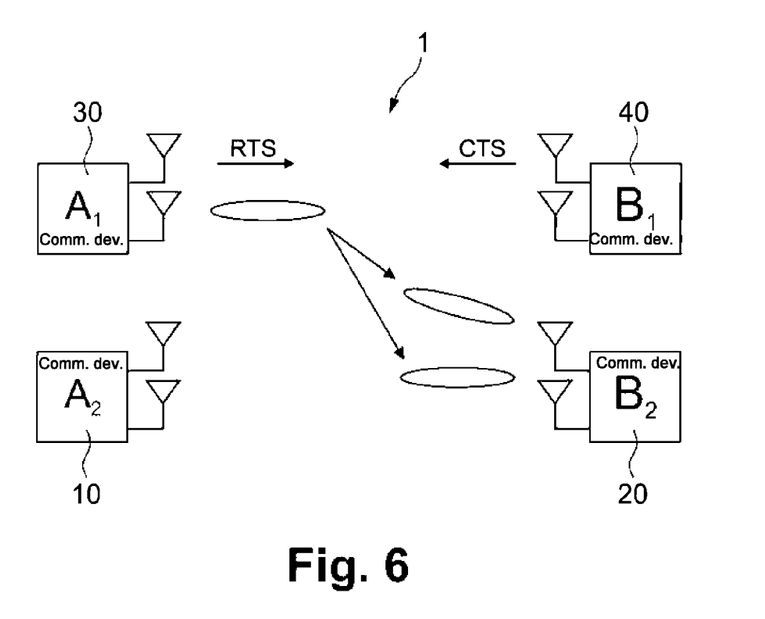
FIG. 6 shows in a schematic diagram processing of the second communication device according to the present disclosure.

In the following, with reference to FIGS. 5 and 6, the communication method illustrated above will be explained in detail with regard to the exemplary communication system depicted in FIG. 1. FIG. 5 shows in a schematic diagram the processing performed by the first communication device according to the communication method of the present disclosure and FIG. 6 shows the corresponding processing performed by the second communication device. To simplify the illustration in mathematical equations, the first communication device 10 is referred to as $A_2$, the second communication device 20 is referred to as $B_2$ and the further communication devices 30, 40 are referred to as $A_1$ and $B_1$ respectively. $A_1$ and $B_1$ are the primary link devices, and $A_2$ and $B_2$ are the spatial reuse devices. Also for ease of exposition, the mathematical formulations are presented for the case of one antenna array at each device. However these can be easily extended to the more general cases of multiple antennas at any of the devices. Some of the implications of possible extensions are pointed out in this description.

In the following it is assumed that the two pairs of devices have already conducted some kind of beamforming training between themselves, i.e., $A_1$ with $B_1$ and $A_2$ with $B_2$ in order to establish one or a set of candidate analog beams which will be used in the communication between themselves. This procedure is performed without taking into account the presence of any other devices, except for the one trained. Hence, the training between $A_1$ and $B_1$ is considered interference free from $A_2$ or $B_2$, whereas the training between $A_2$ and $B_2$ is agnostic of the interference from $A_1$ and $B_1$. Such beamforming training is standard and hence not be explained in detail herein. The candidate sets of beams at $A_2$ and $B_2$ determined during such training will be referred to as $S_{A_2}$ and $S_{B_2}$. Finally, it shall be noted that the roles of $A_1$, $B_1$, $A_2$ and $B_2$ have been chosen for description purposes only. It goes without saying that the roles can be interchanged.

In the scenario of FIG. 5, $A_1$ and $B_1$ are the first devices using radio resource for the primarily link. Flow control messages (RTS/CTS) are being exchanged between the two devices in order to determine if the link is free, followed by a transmission opportunity in which the actual data is exchanged.

On the other hand, $A_2$ and $B_2$ attempt to re-utilize the channel of $A_1$ and $B_1$ during the same TxOP, on the condition that $A_2$ and $B_2$ are not interfering with the primary link devices $A_1$ and $B_1$. For that, at least $A_2$ comprises an interference alignment module according to the present disclosure and performs the interference alignment accordingly.

The interference alignment processing starts with $A_2$ estimating the channel between itself and the device $B_1$ of the primary link devices, by "listening to" the link negotiations of $A_1$ and $B_1$. Thereby, $A_2$ estimates the channel from $B_1$ at all its antenna elements i.e., $h_{meas}=H_{A_2,B_1}w_{B_1,T}$, where $w_{B_1,T}$ is the transmit AWV with which $B_1$ communicates with $A_1$ and $H_{A_2,B_1}$ is the full channel matrix from each antenna element of $B_1$ to each antenna element of $A_2$. A possible method to obtain $h_{meas}$ is by performing angle of arrival estimations and applying the known antenna geometry at $A_1$. $B_2$ does not necessarily need to listen to $B_1$, as the latter will be in receive mode, thus it will create no interference. $A_2$, however, needs to listen to $B_1$ and estimate $h_{meas}$ in order to be able to control the interference towards $B_1$.

After the estimation of the channel, $A_2$ acquires and decodes in this scenario mismatch information regarding the largest mismatch between the AWVs of the transmission and reception patterns used by the receiving primary link device. Furthermore, the distance measure, based on which this mismatch was calculated, should be known or acquired as additional information. In this preferred embodiment, $B_1$ is capable of evaluating the mismatch data and transmitting the mismatch data to $A_2$ for further processing. The distance function, based on which the largest mismatch is computed can for instance be the Euclidean distance i.e., $d(a,b)=\sqrt{(a-b)^H(a-b)}$. For this distance measure, the mismatch between the transmit and receive patterns is then represented by: $\epsilon_R=\sqrt{(w_{B1,R}-w_{B1,T})^H(w_{B1,R}-w_{B1,T})}$. It shall be noted that any differentiable measure, which satisfies the common three distance axioms may be used in the alternative. Subsequently, $A_2$ determines beamformers that, when applied directly or digitally combined, satisfy a defined interference condition. That is, beamformers that satisfy this condition have an interference level at the receiving device of the primary link devices ($B_1$, in this scenario) smaller than a certain threshold, for all possible transmit channels from $A_2$ to $B_1$ whose distance measure to $h_{meas}$ is smaller than a mismatch value. In this example, this value depends on the non-reciprocity mismatch and a channel norm.

The mismatch is determined based on information provided by $B_1$. In a preferred embodiment, the information includes a maximal mismatch value between transmission and reception antenna weight vectors of $B_1$ and a distance measure according to which this was calculated. Preferably, the information is transmitted along with the CTS-Signal transmitted by $B_1$ in response to an RTS.

$A_2$ uses this information to choose an appropriate beamformer (analog and possible digital) which avoids interference to $B_1$, considering the case of the worst mismatch, depending on non-reciprocity mismatch information and channel strength.

The worst case interference (WI), which is created by $A_2$ to $B_1$ can be determined by:

$$\max_{h_{A2,NR}} Interf_{B2}(h_{A2,NR}, w_{A_2,T}) \text{ s. to } d(h_{A2,NR}, h_{A2,meas}) \leq \qquad (1)$$

$$\text{Mismatch}(\epsilon_R, \|H_{B_1 A_2}\|),$$

where $h_{A2,meas} = H_{A_2B}^1 w_{B_1,T}$. In (1), $h_{A2,NR} w_{B_{1,R}}{}^H H_{B_1 A_2} = H_{A_2 B_1} w_{B_{1,R}}$ is the unknown true channel from each antenna element of $A_2$ to the entire antenna array of $B_1$, which is receiving with the analog beam $w_{B_{1,R}}$.

In a preferred embodiment, the function based on which the mismatch is evaluated can be defined as $$\text{Mismatch}(\epsilon_R, \|H_{B_1 A_2}\|) = \epsilon_R \|H_{B_1 A_2}\|$$

where as norm it is chosen $\|H_{B_1 A_2}\| = \text{Tr}\{\sqrt{H_{B_1,A_2}{}^H H_{B_1,A_2}}\}$. However other definitions are possible for both the function and the norm definitions. Non-reciprocity mismatches at the $A_2$ device or uncertainties in the estimated channel can be handled by appropriately choosing the mismatch function to incorporate the new mismatch information. This can then be straightforwardly incorporated in the mismatch value in (1) without essentially changing the proposed approach.

If only one antenna array is available at each user, the interference condition can be expressed in closed form, for some analog beams in $S_{A_2}$, by imposing that there exists some non-negative $\lambda$ such that:

$$\begin{pmatrix} -w_{A_2,T} w_{A_2,T}^H + \lambda I & \lambda h_{A_2,meas} \\ \lambda h_{A_2,meas}^H & \gamma \end{pmatrix}$$

is positive semidefinite,
where $\gamma = \lambda h_{A_2,meas}{}^H h_{A_2,meas} - h_{A_2,meas}{}^H (w_{A_2,T} w_{A_2,T}^H + \lambda I) h_{A_2,meas} - \epsilon_R \|H_{B_1 A_2}\|^2$ and I denotes an identity matrix of appropriate dimensions.

To avoid trial over non-negative values for $\lambda$, optimum $\lambda$ can be found in the case of one antenna array at each user by replacing the optimum value of the worst case interference (WI) equation, denoted $h_{A_2,NR}^*$, in the constraint and imposing that equality holds, for this. The optimum of the worst case interference (WI) equation may be written as:

$$h_{A_2,NR}^* = \frac{1}{\lambda}\left(I - \frac{w_{A_2,T} w_{A_2,T}^H}{\lambda + w_{A_2,T}^H w_{A_2,T}}\right)$$

In a preferred embodiment, analog antenna weight vectors are available from a previous training, so that some of the above computations can be performed offline reducing computational time. A similar condition to the one above can be derived and imposed if multiple PAAs are present at $B_2$. If multiple RF chains are available at $A_2$ the existence of finer beamformers can be tested, such that the worst interference is considered simultaneously with additional requirements on the quality of the SR link to be formed e.g., imposing that a minimum MCS can be satisfied. Finer beamformers refers to a combination of the existing analog beams in $S_{A_2}$, however, digitally precoded.

Finally, $A_2$ chooses among the beams determined as outlined above one or more beams to either communicate with $B_2$ on the spatial reuse link or to perform further training, if required. Preferably, $A_2$ sends an RTS to $B_2$. using the best beam which respects the interference condition from candidate set $S_{A_2}$.

With reference to FIG. 6 the processing of the second communication device $B_2$ will be explained in greater detail. Since $B_2$ is in receive mode in this scenario, $B_2$ creates no interference to $A_1$ or $B_1$. Hence, $B_2$ is only determining how much interference is leaked from $A_1$ or $B_1$ to any beam of the candidate set $S_{B_2}$.

$B_2$ can estimate the effective interference from $A_1$, which it experiences on one or more of the analog beams, in the candidate set $S_{B_2}$ by measuring the effective channels $h_{eff,B_2 A_1}{}^{(i)} = w_{B_2,R,i}{}^H H_{B_2 A_1} w_{A_1,T}$, where $B_{2,R,i}$ is the i-th AWV in the candidate set $S_{B_2}$ and $H_{B_2 A_1}$ is the channel between each antenna sub-element of $A_1$ to each antenna element of $B_2$ and $w_A$ is the transmitting analog beam employed by device $A_1$ in the communication with $B_1$.

Subsequently, $B_2$ estimates whether a communication with $A_2$ is possible, e.g., by checking if the expected SINR on one of the candidates for the communication with $A_2$ is sufficiently large.

Finally, $B_2$ signals to $A_2$ either that communication is possible on the current beam configuration and the current SNR in order to decide on the MCS to be used, or that further training is required.

Figure 7:
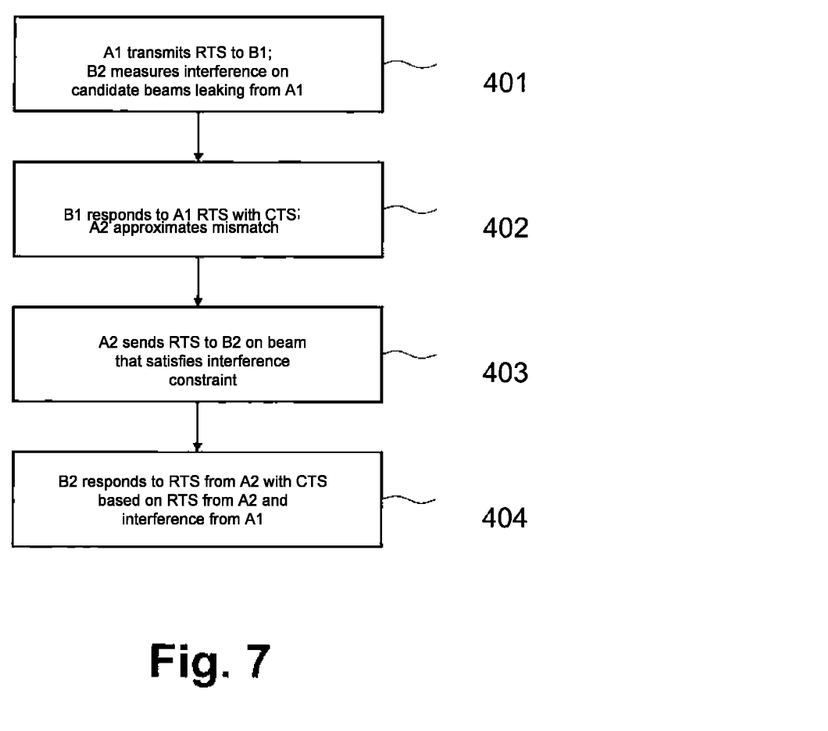
FIG. 7 shows a flow chart of a preferred communication method for spatial reuse according to the present disclosure.

FIG. 7 shows a flow chart of the individual stages of the spatial reuse processing in the above outlined scenario according to the present disclosure.

At stage 1, 401, $A_1$ transmits RTS to $B_1$ and at the same time, $B_2$ sweeps the analog beams of the candidate set $S_{B_2}$. to measure any interference on the candidate beams leaking from $A_1$. Subsequently, $B_2$ chooses the least interfered sector or sectors from the candidate set $S_{B_2}$.

At stage 2, 402, $B_1$ responds to the RTS from $A_1$ with CTS. $A_2$ measures the channel characteristics $h_{meas} = H_{A_2 B_1} w_{B_1,T}$ and $\|H_{B_1 A_2}\|$ Further, $A_2$ determines and selects the analog beams $w_{A_2,T}^H$ in such a manner that an interference condition is respected. This determination, in particular, the calculation of the interference condition, depends on the individual setup of the involved devices.

Under the assumption that (1) best candidate analog beams $S_{A_2}$ and $S_{B_2}$ between $A_2$ and $B_2$ have been determined, (2) $A_1$, $A_2$, $B_1$, $B_2$ each only comprise one phased antenna array, and (3) CSI from beamformed A1 to beamformed $B_2$ as well as CSI from beamformed $B_1$ to all antenna elements at $A_2$ are available, the interference constraint under mismatch is defined as:

$$WI = \max_{h_{A2,NR}} w_{A_2,T}^H h_{A2,NR} h_{A2,NR}^H w_{A_2,T} \text{ s. to } d(h_{A2,NR}, h_{A2,meas}) \leq \qquad (1)$$

$$\epsilon_R \|H_{B_1 A_2}\|,$$

In this case the mismatch can then be approximated by:

$$(w_{B_1,T} - w_{B_1,R})^H H_{A_2 B_1}(w_{B_1,T} - w_{B_1,R}) \leq (w_{B_1,T} - w_{B_1,R})^H \\ (w_{B_1,T} - w_{B_1,R}) \lambda_{max}(H_{A_2 B_1}{}^H H_{A_2 B_1}) \leq \epsilon_R^2 \|H_{A_2 B_1}\|^2$$

where $\|H_{A_2, B_1}\|^2$ is the sum of powers successively received at each antenna element of $A_2$, where $\lambda_{max}(H_{A_2, B_1}{}^H H_{A_2, B_1})$ is the maximum eigenvalue of the matrix $(H_{A_2, B_1}{}^H H_{A_2, B_1})$.

The approximation makes it possible to determine the interference condition without having access to the individual elements $H_{A_2 B_1}$ and $w_{B_1,T}$, which are typically not available. In other cases, for instance when $B_1$ comprises multiple phase antenna arrays convex solvers might have to be applied on the $A_2$ side in order to determine a more complex interference condition.

Next, at stage 3, 403, if there exists a $w_{A_{2,T}}$ such that the above constraint is respected, $A_2$ selects this beam and sends RTS to $B_2$, wherein $B_2$ listens on the beam from $S_{B_2}$ that it has determined in stage 1 to be the least interfered with.

In a preferred embodiment $A_2$ may send successively on all beams RTS, if more than one analog beams respect the interference condition.

Finally, at stage 4, 404, $B_2$ replies with CTS preferably including the index of the best beam and the corresponding signal-to-interference-plus-noise ratio which is based on the received signal from $A_2$ and the received interference from $A_1$.

If no $w_{A_{2,T}}$ could be found respecting the interference condition, spatial reuse at that particular TxOP is not feasible, at least not without the risk of substantially interfering with the primary link. The interference alignment processing may then be restarted with the detection of RTS/CTS signals for another TxOP.

In summary, the communication device and method disclosed herein provide a practical solution to spatial reuse in mm-wave communication domain. The solution is suited for mm-wave communication and in particular avoids the drawbacks of prior art regarding full CSI estimation. The additional signaling required for the communication device and method can be easily integrated in future IEEE802.11 standards or 5 G mm-wave related standards without introducing any large overhead to the protocol. Preferably, the additional signaling can simply appended to the flow control messages exchanged before each transmission opportunity.

It shall be noted that the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A first communication device (10) for communicating with a second communication device (20) over a link (50) that is utilized at the substantially same time and with the substantially same frequency resource (60) by a pair of further communication devices (30, 40), said first communication device (10) comprising:
   one or more antenna arrays (11, 12) with which beamforming can be performed;
   a control unit (17) configured to apply beamformers to control beamforming by the one or more antenna arrays; and
   an interference alignment module (18) configured to determine whether at least one of the beamformers satisfies an interference condition such that a level of interference leaked to the further communication devices (30, 40) by the first communication device (10) is below a defined threshold, and if available, select the at least one beamformer for communicating with the second communication device (20),
   wherein the interference condition is based on channel characteristics between the first communication device (10) and at least one of the further communication devices and non-reciprocity mismatch.

2. The first communication device according to embodiment 1, wherein the interference alignment module (18) is configured to obtain the channel characteristics and the non-reciprocity mismatch without requiring exact channel coefficients from each individual antenna element of the further communicating device.

3. The first communication device according to any one of embodiments 1 or 2, wherein the interference alignment module (18) is configured to determine the channel characteristics by detecting flow control signals that are exchanged over the link between the pair of further communication devices (30, 40).

4. The first communication device according to any one of embodiments 1 to 3, wherein the interference alignment module (18) is configured to apply one or more receive beamformers to determine the channel characteristics between a transmitting device of the pair of further communication devices (30, 40) and the first communication device (10).

5. The first communication device (10) according to any one of embodiments 1 to 4, wherein the interference alignment module (18) is configured to determine the channel characteristics of a transmitting device of the pair of further communication devices and the first communication device (10) based on beamforming training units and/or a channel estimation sequences included in flow control signals exchanged over the link (50) between the pair of further communication devices (30, 40).

6. The first communication device according to any one of embodiments 1 to 5, wherein the non-reciprocity mismatch depends on a difference between transmission and reception antenna patterns of at least one of the pair of further communication devices.

7. The first communication device according to any one of embodiments 1 to 6, wherein the interference alignment module (18) is configured to determine the non-reciprocity mismatch of at least one of the pair of further communication devices by receiving mismatch information provided by at least one of the pair of further communication devices.

8. The first communication device according to embodiment 7, wherein the mismatch information includes a level of non-reciprocity of the transmission and reception antenna patterns of the pair of further communication devices (30, 40).

9. The first communication device according to embodiment 7, wherein the mismatch information includes a value quantifying the mismatch between the transmission and reception antenna patterns of the at least one of the pair of further communication devices and information indicative of a distance measure based on which this value was calculated.

10. The first communication device according to any one of embodiments 7 to 9, wherein the mismatch information is included in flow control signals exchanged between the pair of further communication devices (30, 40).

11. The first communication device according to embodiment 9, wherein the transmission and reception antenna patterns of the at least one of the pair of further communication devices are defined based on antenna weighting vectors, and the value quantifying the mismatch is computed by a distance measure between these vectors, in particular the Euclidean distance.

12. The first communication device according to any one of embodiments 1 to 11, wherein the interference alignment module (18) is configured to calculate a value for a worst case interference based on the channel characteristics and the non-reciprocity mismatch of the at least one of the pair of further communication devices in order to determine if the interference condition is satisfied.

13. The first communication device according to embodiment 12, wherein the determination of whether at least one of the beamformers satisfies the interference condition includes comparing the value of the worst case interference with a threshold value defining the highest tolerable interference.

14. The first communication device according to any one of embodiments 1 to 13, wherein the defined threshold is predefined.

15. The first communication device according to any one of embodiments 1 to 13, wherein the defined threshold value is set individually by one of the pair of further communication devices (30, 40).

16. The first communication device according to embodiment 15, wherein the defined threshold is transmitted along with the flow control signals exchanged between the pair of further communication devices (30, 40).

17. The first communication device according to embodiment 15, wherein the defined threshold is determined by the modulation and coding scheme utilized in the communication between the pair of further communications devices (30, 40).

18. The first communication device according to any one of embodiments 1 to 17, wherein the interference alignment module (18) is configured to derive the defined threshold from specific information transmitted by at least one of the further communication devices (30, 40).

19. The first communication device according to any one of embodiments 1 to 18, further comprising a transmission unit for transmitting to the second communication device flow information with the at least one beamformer.

20. An interference alignment module (18) for use in a communication device (10) for communicating with another communication device (20) over a link (50) that is utilized at the substantially same time and with the substantially same frequency resource by a pair of further communication devices (30, 40), the communication device (10) comprising one or more antenna arrays (11, 12) with which beamforming can be performed and a control unit (17) configured to apply beamformers to control beamforming by the one or more antenna arrays (11, 12), the interference alignment module (18) comprising:
   an determination unit for determining whether at least one of the beamformers satisfies an interference condition such that a level of interference leaked to the further communication devices (30, 40) by the first communication device (10) is below a defined threshold, and if available, selecting the at least one beamformer for communicating with the second communication device (20),
   wherein the interference condition is based on channel characteristics between the first communication device and at least one of the further communication devices and non-reciprocity mismatch.

21. A communication device (40) for communicating with another communication device having one or more antenna arrays using different transmission and reception antenna patterns, the communication device (40) comprising:
   an evaluation unit for evaluating a non-reciprocity mismatch between the transmission and reception antenna patterns, and
   a transmission unit for transmitting a value indicative of a level of non-reciprocity of the transmission and reception antenna patterns to a further communication device.

22. A communication method for communicating with a communication device (20) over a link (50) that is utilized at the substantially same time and with the substantially same frequency resource by a pair of further communication devices (30, 40), the method comprising:
   applying beamformers by a control unit (17) to one or more antenna arrays to perform beamforming,
   determining whether at least one of the beamformers satisfies an interference condition such that a level of interference leaked to the further communication devices by the first communication device is below a defined threshold,
   and if available selecting the at least one beamformer for communicating with the second communication device,
   wherein the interference condition is based on channel characteristics between the first communication device and at least one of the further communication devices and non-reciprocity mismatch.

23. A non-transitory computer-readable recording medium that stores therein a computer program product, which, when executed by a processor, causes the method according to embodiment 22 to be performed.

24. A computer program comprising program code means for causing a computer to perform the steps of said method according to embodiment 22 when said computer program is carried out on a computer.

25. A communication system (1) comprising a first and a second communication device (10, 20) and a pair of further communication devices (30, 40), the first communication device (10) is configured to communicate with the second communication device (20) over a link (50) that is utilized at the substantially same time and with the substantially same frequency resource (60) by the pair of further communication devices (30, 40), wherein the first communication device comprises:
one or more antenna arrays (11, 12) with which beamforming can be performed;
a control unit (17) configured to apply beamformers to control beamforming by the one or more antenna arrays; and
an interference alignment module (18) determine whether at least one of the beamformers satisfies an interference condition such that a level of interference leaked to the further communication devices by the first communication device is below a defined threshold, and if available, select the at least one beamformer for communicating with the second communication device (20), the interference condition being based on channel characteristics between the first communication device (10) and at least one of the further communication devices (30, 40) and non-reciprocity mismatch,
wherein at least one of the pair of further communication devices comprises:
one or more antenna arrays having different transmission and reception antenna patterns, and
an evaluation unit configured to evaluate a non-reciprocity mismatch between the transmission and reception antenna patterns, and
a transmission unit configured to transmit a value indicative of a level of non-reciprocity of the transmission and reception antenna patterns to a further communication device.

The invention claimed is:

1. A first communication device for communicating with a second communication device over a link that is utilized at the same time and with the same frequency resource by a pair of further communication devices, said first communication device comprising:
one or more antenna arrays with which beamforming is to be performed,
a control circuitry configured to apply beamformers to control beamforming by the one or more antenna arrays, and
an interference alignment circuitry configured to determine whether at least one of the beamformers satisfies an interference condition in a way a level of interference leaked to the further communication devices by the first communication device is below a defined threshold, and when available, select the at least one beamformer for communicating with the second communication device, and to determine a non-reciprocity mismatch of at least one of the pair of further communication devices by receiving mismatch information provided by at least one of the pair of further communication devices, wherein
the interference condition is based on channel characteristics between the first communication device and at least one of the further communication devices and the non-reciprocity mismatch, and
the mismatch information includes a value quantifying the mismatch between transmission and reception antenna patterns of the at least one of the pair of further communication devices and information indicative of a distance measure based on which this value was calculated.

2. The first communication device according to claim 1, wherein the interference alignment circuitry is further configured to obtain the channel characteristics and the non-reciprocity mismatch without requiring exact channel coefficients from each individual antenna element of the further communicating device.

3. The first communication device according to claim 1, wherein the interference alignment circuitry is further configured to apply one or more receive beamformers to determine the channel characteristics between a transmitting device of the pair of further communication devices and the first communication device.

4. The first communication device according to claim 1, wherein the interference alignment circuitry is further configured to determine the channel characteristics of a transmitting device of the pair of further communication devices and the first communication device based on beamforming training units and/or a channel estimation sequences included in flow control signals exchanged over the link between the pair of further communication devices.

5. The first communication device according to claim 1, wherein the mismatch information includes a level of non-reciprocity of the transmission and reception antenna patterns of the pair of further communication devices.

6. The first communication device according to claim 1, wherein the transmission and reception antenna patterns of the at least one of the pair of further communication devices are defined based on antenna weighting vectors, and the value quantifying the mismatch is computed by a distance measure between these vectors.

7. The first communication device according to claim 1, wherein the interference alignment circuitry is further is configured to calculate a value for a worst case interference based on the channel characteristics and the non-reciprocity mismatch of the at least one of the pair of further communication devices in order to determine if the interference condition is satisfied.

8. The first communication device according to claim 7, wherein the determination whether at least one of the beamformers satisfies the interference condition includes comparing the value of the worst case interference with a threshold value defining the highest tolerable interference.

9. The first communication device according to claim 1, wherein the defined threshold is transmitted along with flow control signals exchanged between the pair of further communication devices.

10. The first communication device according to claim 1, wherein the defined threshold is determined by a modulation and coding scheme utilized in the communication between the pair of further communication devices.

11. The first communication device according to claim 1, wherein the interference alignment circuitry is further configured to derive the defined threshold from specific information transmitted by at least one of the further communication devices.

12. The first communication device according to claim 1, the interference alignment circuitry is further configured to transmit to the second communication device flow information with the at least one beamformer.

13. A first communication device for communicating with a second communication device over a link that is utilized at the same time and with the same frequency resource by a pair of further communication devices, said first communication device comprising:
one or more antenna arrays with which beamforming is to be performed,
a control circuitry configured to apply beamformers to control beamforming by the one or more antenna arrays, and
an interference alignment circuitry configured to determine whether at least one of the beamformers satisfies an interference condition in a way a level of interference leaked to the further communication devices by the first communication device is below a defined threshold, and when available, select the at least one beamformer for communicating with the second communication device, and to determine non-reciprocity mismatch of at least one of the pair of further communication devices by receiving mismatch information provided by at least one of the pair of further communication devices,
wherein the interference condition is based on channel characteristics between the first communication device and at least one of the further communication devices and the non-reciprocity mismatch, and
wherein the mismatch information is included in flow control signals exchanged between the pair of further communication devices.

14. An interference alignment module for use in a first communication device for communicating with a second communication device over a link that is utilized at the same time and with the same frequency resource by a pair of further communication devices, the communication device comprising one or more antenna arrays with which beamforming is to be performed, the interference alignment module comprising circuitry configured to
determine whether at least one of the beamformers satisfies an interference condition in a way a level of interference leaked to the further communication devices by the first communication device is below a defined threshold, and when available, select the at least one beamformer for communicating with the second communication device,
determine a non-reciprocity mismatch of at least one of the pair of further communication devices by receiving mismatch information provided by at least one of the pair of further communication devices,
wherein the interference condition is based on channel characteristics between the first communication device and at least one of the further communication devices and the non-reciprocity mismatch, and
the mismatch information includes a value quantifying the mismatch between transmission and reception antenna patterns of the at least one of the pair of further communication devices and information indicative of a distance measure based on which this value was calculated.

15. A communication device for communicating with another communication device having one or more antenna arrays using different transmission and reception antenna patterns, the communication device comprising circuitry configured to
evaluate a non-reciprocity mismatch between the transmission and reception antenna patterns, the non-reciprocity mismatch being a measure indicative of a mismatch of a transmission pattern and a reception pattern of at least one pair of further communication device, wherein at least one of the pair of further communication devices includes one or more antenna arrays having different transmission and reception antenna patterns,
determine the non-reciprocity mismatch of at least one of the pair of further communication devices by receiving mismatch information provided by at least one of the pair of further communication devices, wherein the mismatch information is included in flow control signals exchanged between the pair of further communication devices, and
transmit a value indicative of a level of non-reciprocity of the transmission and reception antenna patterns to a further communication device,
wherein the mismatch information is included in flow control signals exchanged between the pair of further communication devices.

16. A communication method for communicating with a first communication device over a link that is utilized at the same time and with the same frequency resource by a pair of further communication devices including a second communication device, the method comprising:
applying beamformers to one or more antenna arrays to perform beamforming,
determining whether at least one of the beamformers satisfies an interference condition in a way a level of interference leaked to the further communication devices by the first communication device is below a defined threshold,
when available, selecting the at least one beamformer for communicating with the second communication device, and
determining a non-reciprocity mismatch of at least one of the pair of further communication devices by receiving mismatch information provided by at least one of the pair of further communication devices, wherein
the interference condition is based on channel characteristics between the first communication device and at least one of the further communication devices and the non-reciprocity mismatch, and
the mismatch information includes a value quantifying the mismatch between transmission and reception antenna patterns of the at least one of the pair of further communication devices and information indicative of a distance measure based on which this value was calculated.

17. A non-transitory computer-readable recording medium that stores therein a computer program product, which, when executed by a processor, causes the method according to claim 16 to be performed.

18. A communication system comprising a first and a second communication device and a pair of further communication devices, the first communication device is configured to communicate with the second communication device over a link that is utilized at the same time and with the same frequency resource by a pair of further communication devices,
wherein the first communication device comprises:
one or more antenna arrays with which beamforming is be performed; and
a control circuitry configured to apply beamformers to control beamforming by the one or more antenna arrays; and
an interference alignment circuitry configured to determine whether at least one of the beamformers satisfies an interference condition in a way a level of interference leaked to the further communication devices by the first communication device is below a defined threshold, and when available, select the at least one beamformer for communicating with the second communication device, and to determine a non-reciprocity mismatch of at least one of the pair of further communication devices by receiving mismatch information provided by at least one of the pair of further communication devices, the interference condition being based on channel characteristics between the first communication device and at least one of the further communication devices and non-reciprocity mismatch, and wherein the mismatch information is included in flow control signals exchanged between the pair of further communication devices,
wherein at least one of the pair of further communication devices comprises:
one or more antenna arrays having different transmission and reception antenna patterns, and
circuitry configured to
evaluate a non-reciprocity mismatch between the transmission and reception antenna patterns, the non-reciprocity mismatch being a measure indicative of a mismatch of a transmission pattern and a reception pattern of at least one further communication device, wherein at least one of the pair of further communication devices includes one or more antenna arrays having different transmission and reception antenna patterns, and
transmit a value indicative of a level of non-reciprocity of the transmission and reception antenna patterns to a further communication device.

19. An interference alignment module for use in a first communication device for communicating with a second communication device over a link that is utilized at the same time and with the same frequency resource by a pair of further communication devices, the communication device comprising one or more antenna arrays with which beamforming is to be performed, the interference alignment module comprising circuitry configured to
determine whether at least one of the beamformers satisfies an interference condition in a way a level of interference leaked to the further communication devices by the first communication device is below a defined threshold, and when available, selecting the at least one beamformer for communicating with the second communication device, and
determine a non-reciprocity mismatch of at least one of the pair of further communication devices by receiving mismatch information provided by at least one of the pair of further communication devices,
wherein the interference condition is based on channel characteristics between the first communication device and at least one of the further communication devices and the non-reciprocity mismatch, and
wherein the mismatch information is included in flow control signals exchanged between the pair of further communication devices.

20. A communication device for communicating with another communication device having one or more antenna arrays using different transmission and reception antenna patterns, the communication device comprising circuitry configured to evaluate a non-reciprocity mismatch between the transmission and reception antenna patterns, the non-reciprocity mismatch being a measure indicative of a mismatch of a transmission pattern and a reception pattern of at least one pair of further communication devices,
determine the non-reciprocity mismatch of at least one of the pair of further communication devices by receiving mismatch information provided by at least one of the pair of further communication devices, wherein the mismatch information is included in flow control signals exchanged between the pair of further communication devices, and
transmit a value indicative of a level of non-reciprocity of the transmission and reception antenna patterns to a further communication device,
wherein an interference condition is based on channel characteristics between the communication device and at least one of the further communication devices and non-reciprocity mismatch, and
wherein the mismatch information is included in flow control signals exchanged between the pair of further communication devices.

21. A communication method for communicating with a first communication device over a link that is utilized at the same time and with the same frequency resource by a pair of further communication devices including a second communication device, the method comprising:
applying beamformers to one or more antenna arrays to perform beamforming,
determining whether at least one of the beamformers satisfies an interference condition in a way a level of interference leaked to the further communication devices by the first communication device is below a defined threshold,
determining a non-reciprocity mismatch of at least one of the pair of further communication devices by receiving mismatch information provided by at least one of the pair of further communication devices,
and, when available, selecting the at least one beamformer for communicating with the second communication device,
wherein the interference condition is based on channel characteristics between the first communication device and at least one of the further communication devices and the non-reciprocity mismatch, and
wherein the mismatch information is included in flow control signals exchanged between the pair of further communication devices.

22. A communication system comprising a first and a second communication device and a pair of further communication devices, the first communication device is configured to communicate with the second communication device over a link that is utilized at the same time and with the same frequency resource by a pair of further communication devices,
wherein the first communication device comprises:
one or more antenna arrays with which beamforming is be performed; and
a control circuitry configured to apply beamformers to control beamforming by the one or more antenna arrays; and
an interference alignment circuitry configured to determine whether at least one of the beamformers satisfies an interference condition in a way a level of interference leaked to the further communication devices by the first communication device is below a defined threshold, and when available, select the at least one beamformer for communicating with the second communication device, the interference condition being based on channel characteristics between the first communication device and at least one of the further communication devices and non-reciprocity mismatch,
wherein at least one of the pair of further communication devices comprises:
one or more antenna arrays having different transmission and reception antenna patterns, and
circuitry configured to evaluate a non-reciprocity mismatch between the transmission and reception antenna patterns,
determine the non-reciprocity mismatch of at least one of the pair of further communication devices by receiving mismatch information provided by at least one of the pair of further communication devices, wherein the mismatch information is included in flow control signals exchanged between the pair of further communication devices, and transmit a value indicative of a level of non-reciprocity of the transmission and reception antenna patterns to a further communication device.

\* \* \* \* \*